Patented Aug. 13, 1935

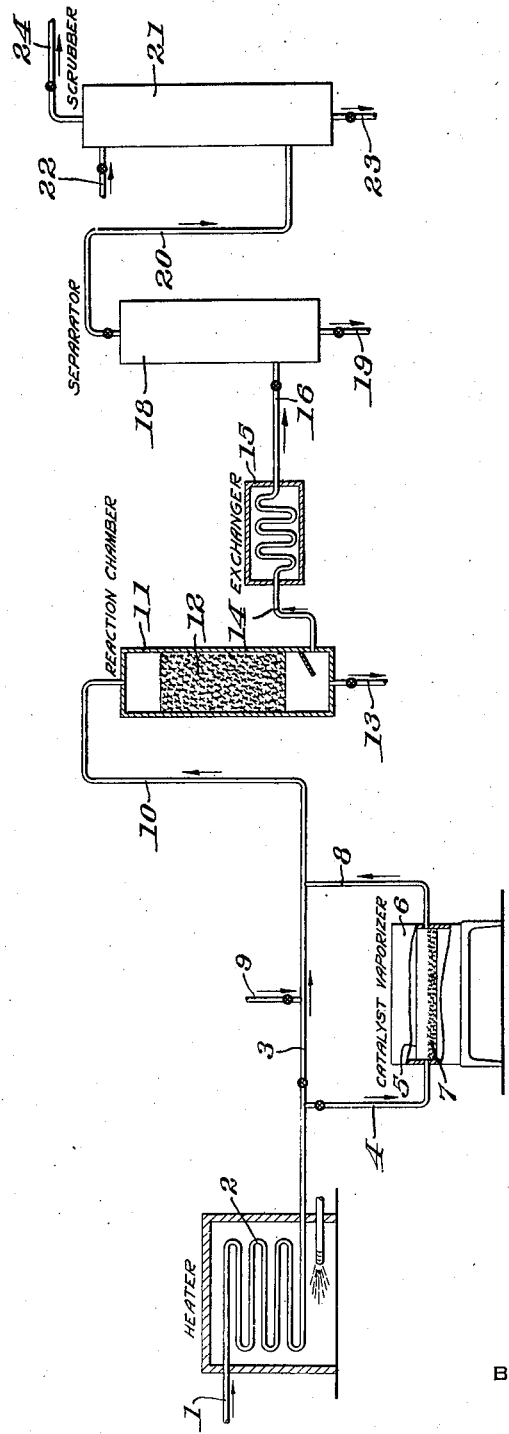

2,011,385

UNITED STATES PATENT OFFICE 2,011,385

PYROLYSIS OF GASEOUS HYDROCARBONS

Charles C. Towne, Poughkeepsie, N. Y., assignor to The Texas Company, New York, N. Y., a corporation of Delaware Application April 27, 1932, Serial No. 607,755

5 Claims. (Cl. 260—168)

This invention relates to the pyrolysis of gaseous hydrocarbons and pertains more particularly to the conversion or reforming of normally gaseous hydrocarbons into higher molecular weight hydrocarbons, such as gasoline and especially aromatic oils such as benzol and its homologues, by subjecting the hydrocarbons to thermal conversion in the presence of a catalyst comprising selenium.

In accordance with the invention, natural or refinery gases, for example the more volatile constituents of casinghead gasoline, or still gases, consisting of saturated or unsaturated hydrocarbons or mixtures thereof, or certain fractions of said gases comprising essentially one or more pure constituents, such as ethane, propane or butane, or ethylene, propylene, butylene, etc., are converted to motor fuel products consisting largely of crude benzol by rapidly raising the gases to conversion temperatures of about 650° C.–950° C. and then subjecting the hot products to a conversion reaction in the presence of a catalyst comprising selenium vapors, whereby the gaseous hydrocarbons are transformed into higher molecular weight compounds which may be separated as liquids and used as a high anti-knock motor fuel or blended with gasoline to increase the anti-knock value thereof.

It has been known heretofore that gaseous hydrocarbons may be converted into higher boiling aromatic compounds by heat treatment at high temperatures, but the reactions have been accompanied by heavy tar formation and copious carbon deposition. I have found that the formation of tar and carbon, which materially reduce the yield of desired compounds, may be substantially prevented by mixing with the gases at or during the reaction or soaking period a predetermined amount of selenium vapors. The most beneficial action of selenium is found to be obtained by introducing the selenium after the heating operation and before or during the digestion or soaking stage. I accordingly prefer to mix the selenium vapors with the hot products after they have reached conversion temperatures or after substantial cracking may have occurred, and then subject the mixture to a reaction or digestion period in a reaction zone wherein no further heat is added.

The invention will be more fully understood from the following description in connection with the drawing which illustrates one form of apparatus suitable for the process.

Referring to the drawing, the reference character 1 represents an inlet pipe through which a gaseous hydrocarbon or mixture of hydrocarbons is fed to a heating coil 2. The hot gases from the heating coil are discharged through a line 3 from which any part or all of the hot gases therein may be by-passed through a line 4 to a tube 5 mounted in a fire or heating chamber 6. The tube 5 is provided with a volatile catalyst 7 which volatilizes as a result of the heat of the gases shunted therethrough from the line 3 or by the heat added in the fire chamber 6. The mixture of gases and the desired amount of vapors of catalyst is then discharged from the tube 5 through a pipe 8. As an alternative method of introducing the catalyst I have shown the line 9 through which a catalyst in the liquid form may be passed into the hot products in the line 3. The hot gases mixed with the catalyst supplied either from line 9 or the tube 5 are transferred through a line 10 to a reaction vessel 11 which may be empty or may contain a bed of a catalytic contact material 12. Polymers or tarry products are drawn off from the reaction chamber through a pipe 13 while the uncondensed vapors and gases pass through a line 14 to a heat exchanger 15. From the heat exchanger the partially cooled products are conducted through a line 16 to a separator 18 provided with a liquid draw-off line 19 and a vapor line 20, the latter leading to a scrubber or recovery plant 21. An absorption medium is charged to the scrubber through a pipe 22 and discharged together with the absorbed material through a line 23 at the bottom while the dry gases are discharged through a line 24 at the top of the scrubber.

In the operation of the process a hydrocarbon gas containing a high percentage of paraffins, such as natural gas or a fraction thereof, is used. The pressure is substantially atmospheric, but in some cases a superatmospheric pressure of the order of 50–1000 lbs. is advantageous. The temperature is regulated so as to give a maximum yield of motor fuel products. The preferred temperature lies within the range of 650° C.–950° C. although a somewhat broader range of 400° C.–1100° C. is contemplated. The catalyst may be introduced after the heating stage and may be added in various ways, either to the hot gases in the transfer line or direct to the reaction chamber. I have shown two methods of introducing the catalyst into the transfer line. According to one method, a portion of the hot gases from the heating coil is shunted through a tube wherein vapors of the catalyst are generated and carried along in the gases to the reaction chamber. I may use in the tube solid selenium or an alloy of selenium, such as iron selenide, which will supply vapors of free selenium to the gases. The quantity of catalyst added preferably amounts to about ½-10% of the total volume of gases entering the reaction chamber. The selenium may also be added to the hot gases in the form of a solution and for this purpose the selenium is dissolved in a suitable solvent, such as carbon disulfide, and a quantity of selenium sufficient to produce an amount of vapor equivalent to that prescribed above is pumped directly into the transfer line.

The gases are heated rapidly to a conversion temperature and then allowed to digest for a relatively longer time in the presence of the selenium. The time of reaction may be prescribed as ranging between $\frac{1}{10}$ and 10 minutes for atmospheric pressure; higher pressures usually lessening the time required, say around ½-5 minutes. The reaction vessel may be empty or filled with a contact agent, such as activated carbon, silica gel, pumice or fuller's earth. The presence of such porous bodies concentrates the gases on the surface thereof and tends to reduce the time required for the reaction. The reaction or digestion operation is preferably conducted at substantially the same temperature as the heating operation, although when using contact agents in the reaction zone and also when using substantial pressure I may drop the temperature in the reaction zone 100° C.–300° C. below the temperature in the heating stage, say to around 400° C.–500° C.

In one method of operation I may supply directly to the reaction chamber a supply of selenium catalyst. To do this I preferably deposit the selenium on a supporting material such as one of the porous contact agents mentioned heretofore. In order to impregnate the contact material with selenium, I may moisten the surface thereof by passing water or steam over the mass and then successively passing ammonia, hydrogen selenide, moist air, and finally hydrocarbon gas thereover. This operation has been found to produce a very satisfactory deposit of selenium on the surface of the contact material and the coating operation may be performed intermittently to supply a fresh deposit of the catalyst as required. Also I may supply selenium directly to the reaction chamber by providing a pulverized solid alloy, such as iron, nickel or lead selenide, either alone or in mixture with one or more of the aforesaid contact agents.

As an illustration of the operation of my process, a sample of gas from a stabilizer consisting of about 85% propane, 10% butane and 5% ethane is rapidly raised to about 800° C. and then mixed with around 1% by volume of selenium vapors, then the mixture passed to an enlarged reaction chamber maintained at approximately the same temperature. The reaction time in the chamber is about 3 minutes. A yield of approximately 3 gallons of hydrocarbons boiling within the range of gasoline, consisting mainly of crude benzol, is obtained per 1000 cubic feet of gas treated.

As another illustration, a charging stock similar to the one above is used but the reaction chamber is filled with pumice and the temperature is held around 750° C. and a pressure of 1000 lbs. is maintained. A liquid fraction boiling within the range of gasoline is obtained amounting to about four gallons per 1000 cubic feet of gas treated.

Obviously many modifications and variations of the invention, as hereinbefore set forth, may be made without departing from the spirit and scope thereof, and therefore only such limitations should be imposed as are indicated in the appended claims.

What I claim is:

1. A process for converting normally gaseous hydrocarbons into liquid products consisting essentially of benzol and its homologues, comprising rapidly heating said hydrocarbons to conversion temperatures of about 650° C.–950° C., passing the heated gaseous hydrocarbons to an enlarged reaction zone maintained at substantially said conversion temperature without the addition of further heat, subjecting the hot hydrocarbons in said reaction zone to the action of a catalyst adapted to promote conversion thereof into higher molecular weight aromatic compounds, said catalyst consisting essentially of free selenium vapors, and then separating the higher molecular weight compounds so formed.

2. The method according to claim 1 in which a contact material selected from the group consisting of activated carbon, pumice, silica gel and fuller's earth is provided in the reaction zone.

3. A process for converting natural gas hydrocarbons into products of higher molecular weight consisting principally of aromatic liquids, such as benzol and its homologues, comprising heating said hydrocarbons in a restricted stream to conversion temperatures of about 650° C.–950° C., commingling with the hot products a predetermined quantity of a catalytic material consisting essentially of free selenium vapors, subjecting the mixture to a reaction period ranging in time from about ½ minute to 5 minutes and then recovering as liquids the higher molecular weight compounds so produced.

4. A process for converting normally gaseous hydrocarbons into products of higher molecular weight consisting principally of aromatic liquids such as benzol, which comprises passing said hydrocarbons through a restricted passageway wherein they are heated to conversion temperatures of from about 650° to about 950° C., commingling with the hot gaseous products a predetermined quantity of free selenium vapors, passing the mixture of hydrocarbons and selenium vapors to a reaction zone wherein they are caused to pass through a mass of solid adsorbent material maintained at a temperature below the boiling point of selenium, removing the gaseous products and separating therefrom normally liquid hydrocarbons thereby produced.

5. A process for converting normally gaseous hydrocarbons into liquid products consisting largely of aromatic hydrocarbons such as benzol and its homologues, which comprises heating a stream of said hydrocarbons to a temperature of from 650° to 950° C., then passing the thereby heated hydrocarbons over a selenium yielding material maintained at a temperature sufficiently high to cause selenium to be vaporized and thereby effecting a reaction of normally gaseous hydrocarbons to normally liquid hydrocarbons, then passing the gases and selenium vapor over a solid adsorbent material maintained at a temperature below the boiling point of selenium, withdrawing the resultant hydrocarbon gases and vapors and recovering therefrom normally liquid products of the reaction.

CHARLES C. TOWNE.